United States Patent

[11] 3,598,372

| [72] | Inventors | Thomas E. Schneider, Jr.<br>Atlanta;<br>William E. Bradley, Jr., Smyrna, both of, Ga. |
|---|---|---|
| [21] | Appl. No. | 791,430 |
| [22] | Filed | Jan. 15, 1969 |
| [45] | Patented | Aug. 10, 1971 |
| [73] | Assignee | Tesco Chemicals, Inc.<br>Atlanta, Ga. |

[54] COOLING TOWER WATER TREATMENT APPARATUS
10 Claims, 2 Drawing Figs.

[52] U.S. Cl. .................................... 261/110, 137/268
[51] Int. Cl. .................................... B01f 3/04
[50] Field of Search ........................... 137/268; 261/DIG. 46, DIG. 11, 110, 111

[56] References Cited
UNITED STATES PATENTS

| 2,120,807 | 6/1938 | Kundel | 137/268 X |
| 2,709,522 | 5/1955 | Osborne | 261/DIG. 46 |
| 2,859,766 | 11/1958 | Shuldener | 261/DIG. 46 |
| 2,874,032 | 2/1959 | Kuehner | 137/268 X |
| 3,094,134 | 6/1963 | Currie | 137/268 X |
| 3,203,440 | 8/1965 | Schneider, Jr. | 137/268 |
| 3,229,709 | 1/1966 | Gerken | 137/268 |
| 3,332,871 | 7/1967 | Robinson | 261/DIG. 46 |
| 3,401,116 | 9/1968 | Stanwood | 137/268 X |
| 3,416,897 | 12/1968 | Long et al. | 137/268 X |
| 3,430,823 | 3/1969 | Hunsaker | 137/268 X |

*Primary Examiner*—Tim R. Miles
*Attorney*—Jones and Thomas

ABSTRACT: Cooling tower water treatment apparatus comprising a chemical-mixing device connected to the water makeup valve of the cooling tower. The chemical-mixing device includes a chemical container for supporting a shaped chemical composition, and a water container communicating with the water level valve and with the lower portion of the chemical container. The water flowing from the makeup valve through the water container impinges upon the lower portion of the shaped chemical composition so that the lower portion of the shaped chemical composition erodes and is mixed with the makeup water.

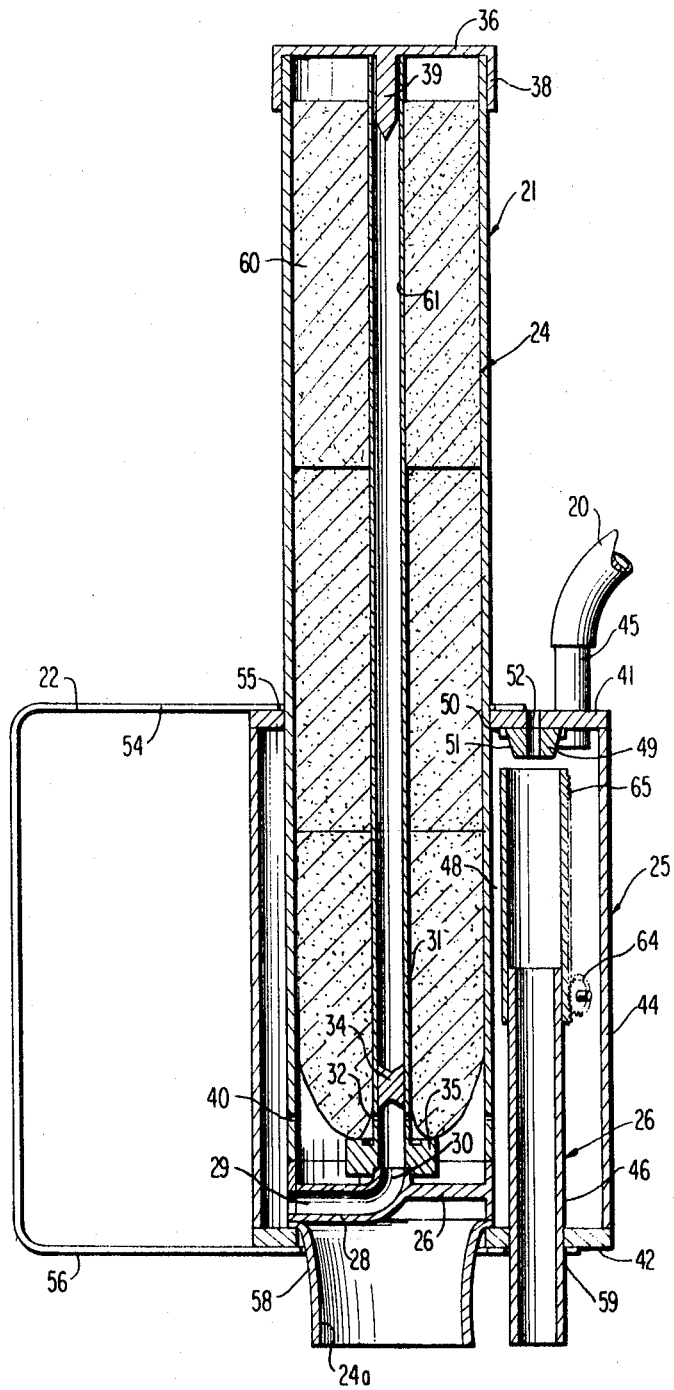

3,598,372

COOLING TOWER WATER TREATMENT APPARATUS

BACKGROUND OF THE INVENTION

Water-cooling towers of the type utilized with air-conditioning equipment for large buildings usually comprise a lattice work of baffles over which the water to be cooled is flowed. When the water reaches the bottom of the cooling tower, it is usually cool and ready to be reused in the air-conditioning system. As the cooling tower functions to cool the water, a substantial amount of evaporation occurs during the cooling process and makeup water must be added to the system to compensate for the evaporation.

After a cooling tower has been operated for an extended period of time, the water in the system usually becomes contaminated, and organic growths and scale build up in the cooling tower, and the surfaces of the cooling tower and its related equipment tend to rust and corrode. Of course, the scale, corrosion and organic growths eventually deteriorate the surfaces of the cooling tower until portions of or possibly all of the cooling tower must be cleaned or replaced.

If the water utilized in the cooling tower is treated with a chemical composition designed to reduce the contamination of the water, the scale, corrosion, and organic growth can be reduced, or even eliminated to prolong the life of the cooling tower.

SUMMARY OF THE INVENTION

Briefly described, the present invention comprises an apparatus for treating cooling tower water to inhibit scale, corrosion, and organic growth within the cooling tower and its related components. A chemical composition is added to the water utilized in the cooling tower circulation system which is specifically chosen to control the water characteristics. The chemical composition is added to the cooling tower makeup water at a controlled rate, so that the characteristics of the water are controlled as the water enters the cooling tower.

Thus, it is an object of this invention to provide a cooling tower water treatment apparatus which retards scale, corrosion, and organic growths on the surfaces of the cooling tower and on its related components.

Another object of this invention is to provide a chemical-feeding unit for use with water-cooling towers which functions to mix a chemical composition with water at an adjustable rate.

Another object of this invention is to provide a chemical-mixing device which is inexpensive to construct and maintain, which can be positively controlled, and which is easily connectable to a water-cooling tower and functions to control the characteristics of the water of the cooling tower.

Other objects, features and advantages of the present invention will become apparent upon reading the following specification, when taken in conjunction with the accompanying drawing.

BRIEF DESCRIPTION OF THE DRAWING

FIG. 2 is a side elevational view, in cross section, of the chemical mixer.

DESCRIPTION OF THE PREFERRED EMBODIMENT

Figure 1:
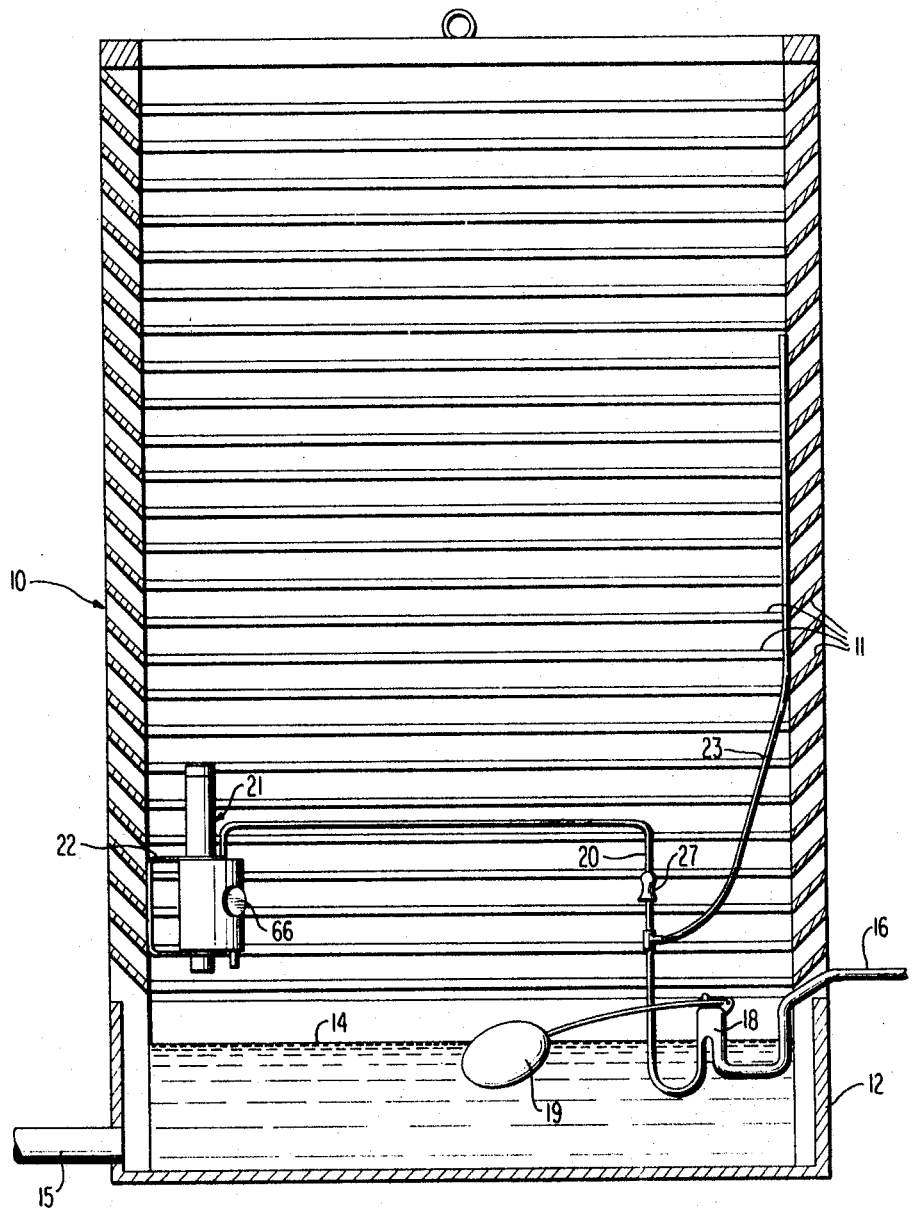
FIG. 1 is a side elevational view of a cooling tower with parts broken away for clarity.

Referring now in more detail to the drawings, in which like numerals indicate like parts throughout the several views, FIG. 1 shows cooling tower 10 which is of the type utilized in conjunction with an air-conditioning system of a building. Cooling tower 10 includes a lattice work of baffles or louvres 11 which are angled so that the water flowing through the cooling tower remains in the cooling tower, yet air is allowed to circulate through the cooling tower for cooling purposes. The water flowing through cooling tower 10 accumulates in the bottom portion 12 up to a level as indicated at 14. Conduit 15 communicates with the bottom portion 12 of cooling tower 10 to direct the water from the cooling tower back to the air-conditioning system of the building (not shown).

As the water flows down through cooling tower 10, a substantial amount of evaporation occurs which aids in the cooling of the water. The evaporation of the water also causes a substantial amount of dissipation of the water in the system, so that makeup water must be added to the system. Conduit 16 which communicates at one of its ends with a source of water under pressure enters cooling tower 10, and is controlled by valve 18. Float 19 is connected to valve 18, and rises and falls with the water level 14 in bottom portion 12 of cooling tower 10. Float 19 controls valve 18, so that when float 19 is lowered with the lowering water level 14, valve 18 is opened and makeup water enters through conduit 16 and extension conduit 20. Extension conduit 20 is connected at one of its ends with valve 18 and at the other of its ends with chemical mixer 21. Branch conduit 23 is connected to extension conduit 20 and projects in an upward direction and is open at its upper end. Clamp 27 is connected to extension conduit 20 and is adjustable to close or partially close this conduit. Branch conduit 23 functions as a standpipe and limits the pressure of the water in extension conduit 20.

Chemical mixer 21 is mounted by means of bracket 22 on the side of cooling tower 10, at an elevation above the water level 14. As is shown in FIG. 2, chemical mixer 21 includes chemical container 24, water container 25, and standpipe 26. Chemical container 24 is cylindrical is cross section, elongated, and normally positioned in an upright attitude as shown. The lower end 24a of chemical container 24 is open, and chemical support 26 extends laterally across chemical container 24, adjacent open end 25. One leg 28 of chemical support 26 defines conduit 29 which opens at one of its ends through the wall of chemical container 24, and which curves in an upward direction and forms upwardly extending opening 30 which is positioned at the longitudinal axis in the lower end of chemical container 24. Positioning tube 31 is normally positioned in chemical container 24 with its lower end being shaped to fit about the upwardly extending opening 30 of conduit 29. A series of apertures 32 extend through the wall of positioning tube 31 at its lower end, and dam 34 blocks the inside of positioning tube 31 above apertures 32. Thus, liquid flowing through conduit 29 up into positioning tube 31 flows out through apertures 32.

The lower end of positioning tube 31 includes support flange 35, and positioning tube 31 is of a length sufficient to extend from chemical support 26 up to the upper end of chemical container 24. Cap 36 includes downwardly extending flange 38 and centering knob 39 which extends in a downward direction a distance beyond the edge of flange 38. When cap 36 is positioned over chemical container 24, positioning knob 39 is inserted into the open upper end of positioning tube 31, and flange 38 is telescoped over the upper end of chemical container 24. In this manner, positioning tube 31 will be held at its lower end by chemical support 26 and at its upper end by positioning knob 39 in concentric relationship with chemical container 24.

Chemical container 24 defines a series of spaced apertures 40 in its wall at its lower end. Spaced apertures 40 are positioned generally in a single horizontal plane, and at a level approximately equal to the normal level of apertures 32 of positioning tube 31.

Liquid container 25 surrounds chemical container 24 at a position intermediate the ends of chemical container 24, so that both the upper and lower portions of chemical container 24 protrude through the upper and lower walls 41 and 42 of liquid container 25. Liquid container 25 is sealed to chemical container 24, and liquid container 25 is substantially watertight, except as hereinafter described. The sidewall 44 of liquid container 25 is generally cylindrical, and chemical container 24 is offset from the center of liquid container 25. Conduit 20 is connected to liquid container 25 by means of stub tube 45 which extends through the upper wall 41 of liquid container 25.

Standpipe 26 comprises a pair of telescoping tubes, inner tube 46 and outer tube 48. Inner tube 46 protrudes through bottom wall 42 of liquid container 25, and is rigidly held in this position. Outer tube 48 is movable vertically within liquid container 25, and is movable in an upward direction until it abuts plug 49. Plug 49 is connected to upper wall 41, and includes flange 50 and tapered body portion 51. As outer tube 48 of standpipe 26 moves toward upper wall 41, if there is any misalignment of outer tube 48 with plug 49, tapered body portion 51 guides outer tube 48 into engagement with flange 50, whereupon plug 49 functions to block communication between standpipe 26 and the internal portion of liquid container 25. Vent opening 52 extends through plug 49 and upper wall 41, and normally vents liquid chamber 25 except when standpipe 26 is in abutting relationship with plug 49. Rack 65 is connected to outer tube 48 and gear 64 engages rack 65. Knob 66 (FIG. 1) is located outside liquid container 25 and controls the rotation of gear 64 and the vertical movement of rack 65 and outer tube 48.

Support bracket 22 includes upper leg 54 which defines opening 55 for receiving chemical container 24, and lower leg 56 which defines opening 58 and 59 which are sized and spaced apart a distance suitable for receiving the lower ends of chemical container 24 and of inner tube 46 of standpipe 26. Chemical mixer 21 can be inserted in support bracket 22 by first inserting the upper end of chemical container 24 through opening 55 of bracket 22, and then inserting the lower ends of chemical container 24 and standpipe 26 through their respective openings 58 and 59. Bracket 22 can be attached to the frame or wall structure of a cooling tower by conventional means, such as bolts, etc.

OPERATION

When chemical mixer 21 is to be supplied with sticks of chemical composition, cap 36 is removed from the upper end of chemical container 24, and positioning tube 31 is withdrawn. A series of shaped chemical compositions 60, each of which defines a central opening 61 and which includes a cylindrical outer surface, are inserted over positioning tube 31, by inserting the central opening 61 of each shaped chemical composition 60 over positioning tube 31, and moved down tube 31 until the lowermost shaped chemical composition 60 rests on support flange 35. After the desired number of shaped chemical compositions 60 have been placed on positioning tube 31, tube 31 is grasped at its upper end and lowered down into chemical container 24 until its lower end is inserted over the upwardly extending opening 30 of chemical support 26. Cap 36 is then repositioned on the top of chemical container 24, with its positioning knob 39 being inserted inside positioning tube 31. Positioning knob 39 functions to center positioning tube 31 within chemical container 24 so that each spaced chemical composition 60 is held in spaced relationship with respect to the sides of chemical container 24.

During the normal operation of a cooling tower the water used by an air-conditioning system flows over the baffles or louvers 11 of the cooling tower while air circulates between the baffles. The water is cooled in this manner, and a substantial amount of the water evaporates and is lost to the atmosphere. When the level 14 of the water in the bottom 12 of cooling tower 10 is lowered due to the evaporation, float 19 is also lowered and functions to open valve 18, whereupon water from a pressurized water source flows through conduit 16 and 20 to chemical mixer 21.

As is shown in FIG. 2, the water enters liquid container 25 through conduit 20 and is allowed to fall to the bottom of liquid container 25. As the water level builds up in liquid container 25, it eventually covers the opening of conduit 29 through the side of chemical container 21 and apertures 40 of chemical container 21, until it reaches the upper end of standpipe 26. If the water continues to rise in liquid container 25, it begins to flow down through standpipe 26, and into the supply of water at the bottom of cooling tower 10.

As the water from liquid container 25 enters chemical container 24 through apertures 40 in the sidewall of chemical container 40 and through apertures 32 of positioning tube 31, the water streams upon and impinges against the bottom portion of the lowermost shaped chemical composition 60, and tends to erode the chemical composition. Of course, the eroded portion of the chemical composition falls with the water from chemical container 24 through open end 25, and into the mass of water in the bottom 12 of cooling tower 10.

The erosion of shaped chemical composition 60 is such that as the lower end of shaped chemical composition is eroded and dissipated, a new surface will be presented to the impinging water by the shaped chemical compositions moving down in chemical container 24. With this arrangement, whatever the amount of the shaped chemical compositions 60 which are present in chemical container 24, the water flowing through apertures 40 and 42 will always impinge upon the lower portion of the shaped chemical compositions. Also, as the chemical compositions are dissipated, additional sticks of chemical composition can be inserted into chemical container 24 by merely removing cap 36 and inserting the new stick down into chemical container 24, or by withdrawing positioning tube 31 and adding a new stick onto positioning tube 31 and then reinserting the positioning tube within chemical container 24.

The flow velocity of the water flowing through apertures 40 and 32 can be controlled by controlling the level or head of water present in liquid container 25. Standpipe 26 is adjustable by means of gear 64 engaging rack 65 of outer tube 48. Knob 66 (FIG. 1) can be rotated from outside liquid container 25 to adjust the height of outer tube 48. Thus, if increased flow velocity is desired through apertures 40 and 32, knob 66 can be rotated to elevate outer tube 48, to increase the hand of water in chemical container 25. Furthermore, if it is desired to flow water through apertures 40 and 32 at a liquid pressure substantially equal to the line pressure from conduits 16 and 20, knob 66 can be rotated until gear 64 elevates outer tube 48 up into engagement with plug 49, whereupon the open upper end of standpipe 26 is blocked. This virtually seals liquid container 25 from the atmosphere since vent opening 52 of plug 49 then only communicates with standpipe 26. If branch conduit 23 is closed by its clamp 27, the pressure within liquid container 25 will become substantially equal to line pressure, which will cause liquid flow through apertures 40 and 32 to increase accordingly. If branch conduit remains open, the pressure in liquid container 25 will increase an amount proportional to the head of water built up in branch conduit 23. The increased flow through apertures 40 and 32 causes a more vigorous impingement of water against the chemical composition, thus increasing the eroding of the chemical composition. Furthermore, since standpipe 26 is blocked by plug 49, all of the water entering chemical mixer 21 through conduit 20 will be forced through apertures 40 and 32 and to impinge against the chemical composition. Thus, the ratio of chemical composition mixed with a given amount of water can be controlled by controlling the elevation of standpipe 26, and can be radically increased by blocking standpipe 26.

In the normal use of the chemical mixer 21, the operator will install the chemical mixer as is shown in FIG. 1, and will place chemical sticks in chemical container 24 that are appropriate to treat the water of the system. For instance, water having certain acid characteristics will be treated with a chemical composition to lower the acidity. Standpipe 26 can be adjusted to engage plug 49 so that all of the makeup water must flow through chemical container 24 and impinge upon the chemical sticks. After the system has run in this manner for a length of time sufficient to add a relatively large amount of chemical composition to the water already in the cooling tower, the operator can readjust standpipe 26 to an expected normal level, whereupon a portion of the water flowing through chemical mixer 21 will flow down through standpipe 26, and the level of water in liquid container 25 will be such that the velocity of flow through apertures 40 and 32 will erode only the amount of chemical composition necessary to treat the makeup water.

The operator will add new chemical sticks to chemical container 24 as the chemical sticks are dissipated. Also, the operator should test the water of the cooling tower at spaced intervals to assure proper water treatment. For instance, the operator may detect that the water of the cooling tower has certain undesirable characteristics that can be eliminated by the use of a different chemical composition, or by a higher or lower setting of standpipe 26.

With the arrangement disclosed, the chemical composition is added only to the makeup water of the cooling tower system. Thus, the water already in the cooling tower system which has been treated and is acceptable for the desired use will not have an additional concentration of chemical composition added thereto. When the cooling tower operates without adding makeup water, the chemical composition is maintained in a relatively dry atmosphere and does not erode or dissipate.

While this invention has been described in detail with particular reference to preferred embodiments thereof, it will be understood that variations and modifications can be effected within the spirit and scope of the invention as described hereinbefore and as defined in the appended claims.

We claim:

1. A water-cooling tower of the type utilized for air conditioners or the like comprising liquid flow means responsive to the level of water in the lower portion of the cooling tower for adding makeup water to the cooling tower, and chemical-mixing means for mixing a chemical composition with at least a portion of the makeup water as the makeup water flows from said fluid flow means, said chemical-mixing means comprising an elongated chemical container normally positioned in an upright attitude and defining an open lower end and a plurality of openings about its lower end, support means positioned at the lower end of said chemical container for supporting a shaped chemical composition in said chemical container, a water container communicating with the plurality of openings of said chemical container, conduit means connecting said water container with said liquid flow means, a standpipe positioned in and opening through the lower portion of said water container for controlling the height of liquid level in said water container, and means for closing communication between said standpipe and said water container.

2. The invention of claim 1 wherein said chemical-mixing means includes control means adjustable to mix the chemical composition with all of or only varying portions of the makeup water.

3. The invention of claim 1 wherein said fluid flow means comprises a float valve communicating with a source of pressurized water, and wherein said chemical-mixing means is positioned above the normal level of cooling tower water.

4. The invention of claim 1 wherein said chemical-mixing means includes means for flowing water from said liquid flow means into impinging relationship with a shaped chemical composition.

5. The invention of claim 1 and further including means for adjusting the upper level of said standpipe.

6. A chemical-mixing device comprising an elongated chemical container normally positioned in an upright attitude for receiving a shaped chemical composition, said chemical container being open at its lower end and defining a plurality of apertures opening through its side at its lower end, support means positioned in said chemical container at its lower end for supporting a shaped chemical composition, a liquid container surrounding said chemical container intermediate the ends of said chemical container, conduit means communicating with said liquid container for connecting said liquid container to a source of liquid, a standpipe positioned within said liquid container and opening through the lower portion of said liquid container, and means for closing communication between said standpipe and said liquid container.

7. The invention of claim 6 wherein said standpipe comprises a pair of telescoped tubular members, with the inner tubular member connected at its lower end and extending through said liquid chamber and with the outer tubular member being movable in an upward direction about the inner tubular member into abutting relationship with closure means.

8. A water-cooling tower of the type utilized for air conditioners or the like comprising liquid flow means responsive to the level of water in the lower portion of the cooling tower for adding makeup water to the cooling tower; and chemical-mixing means for mixing a chemical composition with at least a portion of the makeup water as the makeup water flows from said fluid flow means, said chemical-mixing means comprising an elongated chemical container normally positioned in an upright attitude and defining an open lower end and a plurality of openings about its lower end, support means positioned at the lower end of said chemical container for supporting a shaped chemical composition in said chemical container, a water container communicating with the plurality of openings of said chemical container, and conduit means connecting said water container with said liquid flow means; said water container surrounding said chemical container intermediate the ends of the chemical container, and the support means of said chemical container including a conduit opening at one of its ends through the side of said chemical container into said water container and extending in an upward direction and opening at its inner end toward the center of said chemical container and a positioning rod positionable over the inner end of the support means conduit and defining a plurality of apertures opening into said chemical container at a level approximately at the same level as the plurality of openings in the chemical container.

9. A chemical-mixing device comprising a chemical container for receiving a shaped chemical composition, said chemical container being open at its lower end and defining at least one aperture opening through its side adjacent its lower end, support means positioned in said chemical container at its lower end for supporting a shaped chemical composition, a liquid container surrounding at least a portion of said chemical container adjacent the aperture in the chemical container, conduit means communicating with said liquid container for connecting said liquid container to a source of liquid, and a standpipe positioned within said liquid container and opening through the lower portion of said liquid container.

10. A chemical-mixing device as recited in claim 9 wherein the device includes a means for closing communication between said standpipe and said liquid container.